US007768402B2

United States Patent
Chen et al.

(10) Patent No.: US 7,768,402 B2
(45) Date of Patent: Aug. 3, 2010

(54) METHOD AND SYSTEM FOR READING AND IDENTIFYING RFID TAG

(75) Inventors: Jian-Ren Chen, Zhudong Town (TW); Yi-Fei Luo, Zhudong Town (TW); Leii H. Chang, Qionglin Shiang (TW); Cheng-I Kuo, Taipei (TW)

(73) Assignee: Industrial Technology Research Institute, Hsin-chu (TW)

( * ) Notice: Subject to any disclaimer, the term of this patent is extended or adjusted under 35 U.S.C. 154(b) by 385 days.

(21) Appl. No.: 11/727,346

(22) Filed: Mar. 26, 2007

(65) Prior Publication Data

US 2008/0129454 A1 Jun. 5, 2008

(30) Foreign Application Priority Data

Dec. 4, 2006 (TW) ............... 95144973 A

(51) Int. Cl.
*G08B 13/14* (2006.01)
(52) U.S. Cl. .............. 340/572.1; 340/572.4; 340/572.8; 340/10.2; 340/10.31; 235/380; 235/385; 235/451; 235/492; 700/95; 700/115; 700/121
(58) Field of Classification Search .............. 340/572.1, 340/572.4, 572.8, 10.2, 10.31; 235/380, 235/385, 451, 492; 700/95, 115, 121
See application file for complete search history.

(56) References Cited

U.S. PATENT DOCUMENTS 6,661,339 B2   12/2003   Muirhead 6,718,888 B2   4/2004   Muirhead
6,943,678 B2   9/2005   Muirhead (Continued)

FOREIGN PATENT DOCUMENTS

WO   2006/030713   3/2006

OTHER PUBLICATIONS

Letter from Mr. Scott Muirhead at Nextreme to Mr. Juan Carlos A. Marquez at Stites & Harbison, PLLC dated Nov. 11, 2009.

(Continued)

*Primary Examiner*—Tai T Nguyen
(74) *Attorney, Agent, or Firm*—Alston & Bird LLP

(57) ABSTRACT

A method and system for reading and identifying RFID tags of the invention is disclosed. The invention is capable of registering and storing information of a plurality of RFID tags attached to objects of the same group into a memory block of at least a specified RFID reader or RFID tag. The invention is also capable of enabling at least a specified RFID reader/tag in response to a first inquiry of an interrogator by transmitting each identification code of the plurality of RFID tags to the interrogator for acknowledgement. The method is capable of achieving the objective of reducing the overall communication time as the reader does not have to inquire one by one to the RFID tags to save the number of times of communication between the inquiry of the reader and the response of the RFID tags. In addition, the reading rate of the RFID system can be improved effectively since at least one of the RFID tags can function as a spokesman for those RFID tags hidden deeply inside a pile of the objects of the group.

14 Claims, 11 Drawing Sheets

U.S. PATENT DOCUMENTS

| | | |
|---|---|---|
| 7,103,433 B1 | 9/2006 | Yuan et al. |
| 7,243,855 B2 * | 7/2007 | Matsumoto et al. ......... 235/492 |
| 7,253,717 B2 * | 8/2007 | Armstrong et al. ......... 340/10.2 |
| 7,342,496 B2 | 3/2008 | Muirhead |
| 2002/0030597 A1 | 3/2002 | Muirhead |
| 2002/0149481 A1 | 10/2002 | Shanks et al. |
| 2003/0006878 A1 | 1/2003 | Chung |
| 2003/0174099 A1 | 9/2003 | Bauer et al. |
| 2004/0145454 A1 | 7/2004 | Powell et al. |
| 2004/0168618 A1 | 9/2004 | Muirhead |
| 2005/0241548 A1 | 11/2005 | Muirhead |
| 2006/0061474 A1 | 3/2006 | Shanks et al. |
| 2006/0109124 A1 | 5/2006 | Dixon et al. |
| 2006/0243174 A1 | 11/2006 | Muirhead |
| 2007/0137531 A1 | 6/2007 | Muirhead |
| 2007/0163472 A1 | 7/2007 | Muirhead |
| 2007/0171080 A1 | 7/2007 | Muirhead |
| 2007/0295822 A1 | 12/2007 | Kawai |
| 2008/0053342 A1 | 3/2008 | Muirhead |
| 2008/0066658 A1 | 3/2008 | Muirhead |
| 2008/0121339 A1 | 5/2008 | Muirhead |
| 2008/0122610 A1 | 5/2008 | Muirhead |
| 2009/0237222 A1 | 9/2009 | Muirhead |

OTHER PUBLICATIONS

Letter and attachments from Mr. Scott Muirhead at Nextreme to Mr. Chen-Yang Sun at Industrial Technology Research Institute dated Jan. 3, 2010.

Letter from Mr. Scott Muirhead at Nextreme to Mr. Juan Carlos A. Marquez at Stites & Harbison, PLLC dated Jan. 31, 2010.

* cited by examiner

5

```
┌─────────────────────────────┐
│ providing a storage platform having │ ─── 50
│ one interrogator and at least a     │
│ reading unit arranged thereon       │
└─────────────────────────────┘
              ↓
┌─────────────────────────────┐
│ stacking a group of objects onto the │ ─── 51
│ storage platform, whereas each       │
│ object has a RFID tag attached       │
│ thereon                              │
└─────────────────────────────┘
              ↓
┌─────────────────────────────┐
│ enabling an interrogator to inquire  │ ─── 52
│ information stored in a plurality of │
│ RFID tags during the stacking of the │
│ group of objects                     │
└─────────────────────────────┘
              ↓
┌─────────────────────────────┐
│ using a distribution algorithm to    │ ─── 53
│ specify and distribute information of│
│ a specific portion of the plurality of│
│ RFID tags to at least a reading unit │
└─────────────────────────────┘
              ↓
┌─────────────────────────────┐
│ enabling each of the reading units   │ ─── 54
│ to back up the information stored    │
│ therein                              │
└─────────────────────────────┘
              ↓
┌─────────────────────────────┐
│ enabling each of the reading units   │ ─── 55
│ in response to an inquiry by         │
│ transmitting the information stored  │
│ therein                              │
└─────────────────────────────┘
```

FIG. 7

METHOD AND SYSTEM FOR READING AND IDENTIFYING RFID TAG

FIELD OF THE INVENTION

The invention relates to a radio frequency identification (RFID) method and system, and more particularly, to a RFID method and system with mass identification capability, by its capability to identify simultaneously "hidden" or visible objects.

BACKGROUND OF THE INVENTION

Radio frequency identification (RFID) is an automatic identification technology with ability to wireless communication (read and write data without direct contact) and without the necessity for line-of-sight, such that it is convenient, easy to use and well suited for automatic operation and can function under a variety of environment conditions while providing a high level of data integrity. RFID is a technology with bright future and is going to replace the conventional bar coding system for many companies and organizations. The RFID system, mainly consisted of RFID tags, readers and a computer system, can be implemented by various applications and produced by many different manufacturers.

Nevertheless, there is no any current RFID system that has the ability to achieve 100 percent reading rate, especially for those using passive RFID tags. The unsatisfactory reading rate may be caused by several reasons. One of the reasons is the adverse effect caused by the material to which a RFID tag is attached thereto, e.g. an absorbent material, such as water, is capable of absorbing electromagnetic waves emitting from a RFID reader for interrogating the tag; and a reflective material, such as metal, is capable of reflecting the electromagnetic waves. Another cause of poor reading rate is that RFID tags, being attached to objects placed in the center of a pile composed of such objects regrouped within a support (case, box, pallet, etc.), are not able to transmit signals out of the pile. Please refer to FIG. 1, which shows a group of objects being stacked and placed on a pallet. As seen in FIG. 1, each object 11 is tagged by a RFID tag 111 whereas there are a plurality of such objects 11 being stacked as a pile and placed on a pallet 10. It is obvious that the RFID tags attached to those objects hidden deeply inside the pile might not be able to be inquired and read correctly. Thus, such pile of objects might cause erroneous information to be registered into the RFID system. Generally, the former cause can be mended by improving the antenna design of RFID tag, such as the near field design by Impinj. However, the improved antenna has little effect on those objects hidden in the pile.

Therefore, it is in need of a method and system for reading and identifying RFID tag that can overcome the aforesaid problems troubling those prior-art RFID systems.

SUMMARY OF THE INVENTION

The invention is to provide a method and system for reading and identifying RFID tag, that is capable of registering and storing information of a plurality of RFID tags, being attached to objects of the same group, into a memory block of at least a specified RFID reader or tag in a successive manner during the formation of the group, and enabling the at least one specified RFID reader/tag to act as a spokesman of the group and respond to a first inquiry of an interrogator by transmitting each identification code of the plurality of RFID tags to the interrogator for acknowledgement, by which the reading rate of the RFID system can be improved.

The invention is to provide a method and system for reading and identifying RFID tag, by which the overall time required for the interrogator to inquire each RFID tag in the group can be reduced since it is no longer required for the interrogator to inquire every RFID tag of the group in an one-by-one manner, rather, it needs only to inquire at least one specified RFID reader/tag.

The invention is to provide a method and system for reading and identifying RFID tag capable of copying and backing up required data into different RFID tags, by which the copies of backup data can be checked in a reciprocal manner and thus data loss can be avoided.

In an embodiment, the method for reading and identifying RFID tag, comprising the steps of: enabling a reading unit to acquire information stored in a plurality of RFID tags, whereas the RFID tags are of the same group; registering the acquired information into a memory block of the reading unit; and enabling the reading unit to respond to an inquiry of an interrogator by transmitting the information stored in the memory block to the interrogator.

In an embodiment, the method for reading and identifying RFID tag, comprising the steps of: enabling at least one reading unit to acquire information stored in a plurality of RFID tags; comparing the information acquired by at least one reading unit with one another in a reciprocal manner; enabling each of the reading units to register information of a portion of the RFID tags specified especially and respectively thereof by a distribution algorithm; and enabling each of the reading units to respond to an inquiry of an interrogator by transmitting the information stored therein to the interrogator.

In an embodiment, the method for reading and identifying RFID tag, comprising the steps of: enabling an interrogator to inquire information stored in a plurality of RFID tags; using a distribution algorithm to specify and distribute information of a specific portion of the RFID tags to at least a reading unit; and enabling each of the reading units to respond to an inquiry by transmitting the information stored therein.

In another embodiment, the method for reading and identifying RFID tag further comprises the step of: enabling each of the reading units to back up the information stored therein onto at least a backup unit.

In another embodiment, the distribution algorithm comprises the steps of: comparing the free memory block size of each of the reading units with one another; and dividing and distributing the information of the RFID tags to be registered by each reading unit in accordance with the free memory block size thereof.

In another embodiment, the distribution algorithm comprises the steps of: comparing the free memory block size of each of the reading units with one another; and evenly dividing and distributing the information of the RFID tags to be registered by each reading unit in accordance with a numbering sequence of the reading units while the free memory block sizes of each of the reading units are the same.

In an embodiment, the system for reading and identifying RFID tag, comprising: a plurality of RFID tags, being respectively attached to each of a group of objects placed on a storage platform; and at least a reading unit, each being disposed on the storage platform for enabling the reading of information of the plurality of RFID tags; wherein the reading unit is capable of comparing the information acquired thereby with one another while using the comparison as basis to select a portion of the RFID tags to be registered.

In another embodiment, the reading unit can be a device selected from the group consisting of a RFID reader and an active RFID tag.

In another embodiment, the storage platform can be an article selected from the group consisting of a shopping cart, a pallet, a container, a rack, a box, a cage, and a chassis with a specific enclosure for storage.

In another embodiment, the system for reading and identifying RFID tag further comprises: an interrogator, connected to an external computer system, capable of accessing information stored in at least one reading unit. In an aspect, the interrogator can be a device selected from the group consisting of a RFID reader and an active RFID tag.

Moreover, in another embodiment, the system for reading and identifying RFID tag further comprises: an interrogator being connected to an external computer system is capable of accessing the information stored in each of the plurality of RFID tags when the group of objects is stacked on the storage platform and thus dividing the accessed information and distributing the information to be registered into at least a reading unit. In an aspect, the interrogator can be a device selected from the group consisting of a RFID reader and an active RFID tag.

Other aspects and advantages of the invention will become apparent from the following detailed description, taken in conjunction with the accompanying drawings, illustrating by way of examples and the principles of the invention.

BRIEF DESCRIPTION OF THE DRAWINGS

FIG. 7 is a flow chart depicting steps of a method for reading and identifying RFID tag in accordance with a third embodiment of the invention.

DESCRIPTION OF THE PREFERRED EMBODIMENT

For your esteemed members of review committee to further understand and recognize the fulfilled functions and structural characteristics of the invention, several preferable embodiments cooperating with detailed description are presented as follows.

Figure 1:
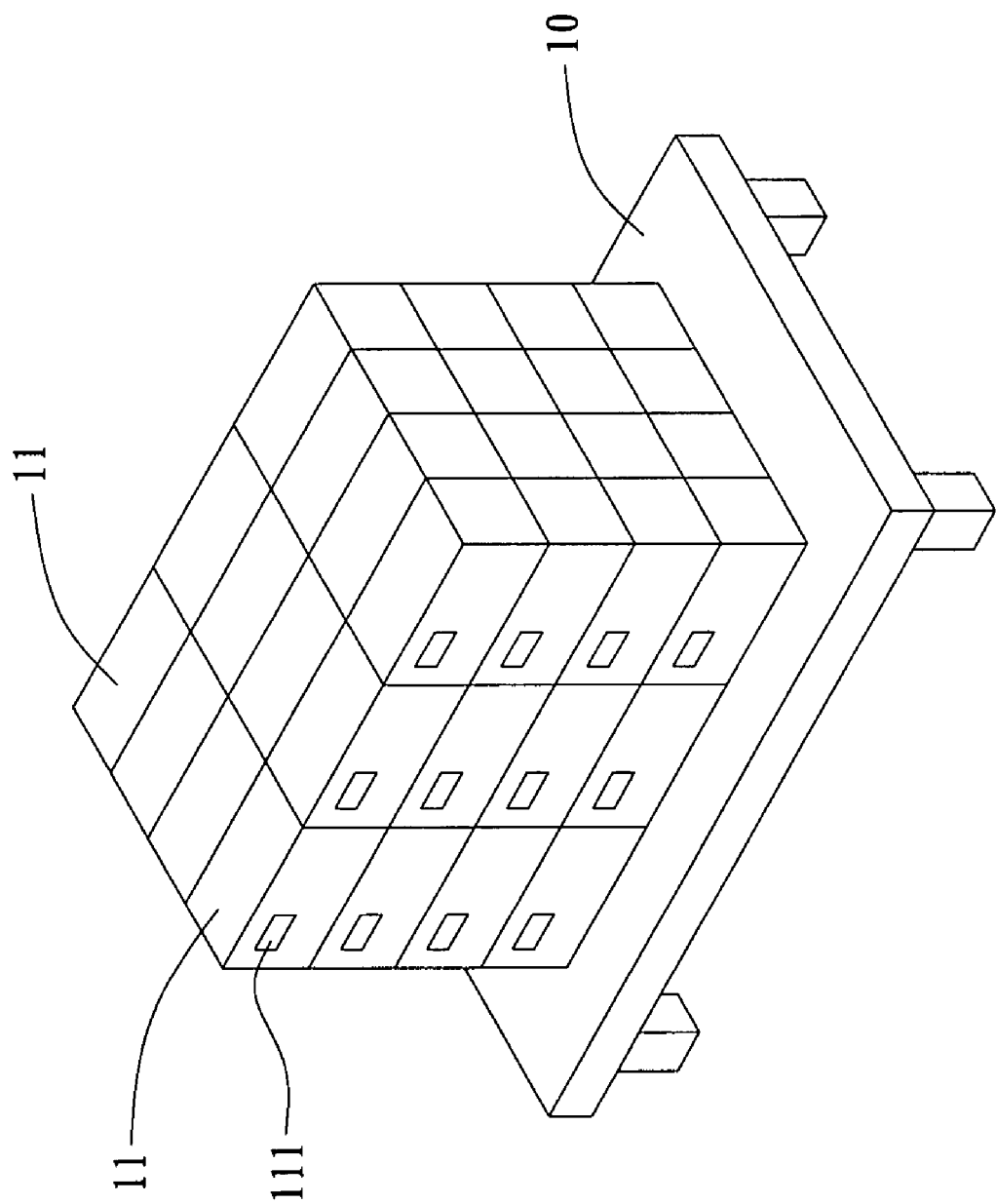
FIG. 1 shows a group of objects being stacked and placed on a pallet.
Figure 2:
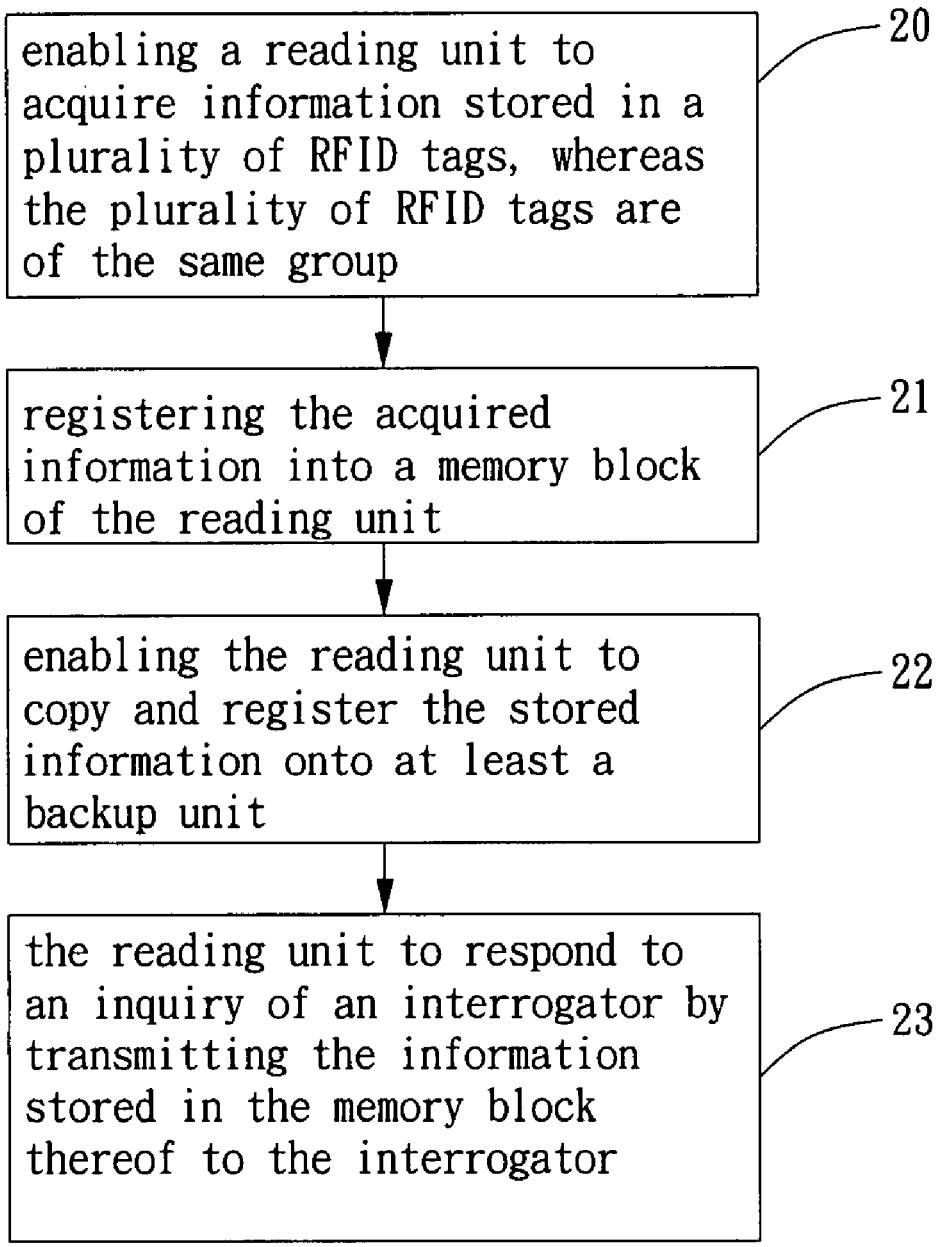
FIG. 2 is a flow chart depicting steps of a method for reading and identifying RFID tag in accordance with a first embodiment of the invention.

Please refer to FIG. 2, which is a flow chart depicting steps of a method for reading and identifying RFID tag in accordance with a first embodiment of the invention. The flow starts at step 20. At step 20, a reading unit is enabled to acquire information stored in a plurality of RFID tags, whereas the RFID tags are of the same group, and then the flow proceeds to step 21. At step 21, all the acquired information is registered into a memory block of the reading unit, and then the flow proceeds to step 22. At step 22, the reading unit is enabled to copy and register the stored information onto at least a backup unit, and then the flow proceeds to step 23. At step 23, the reading unit is enabled to respond to an inquiry of an interrogator by transmitting the information stored in the memory block thereof to the interrogator. It is noted that the reading unit can be a RFID reader or an active RFID tag; and the backup unit can be a RFID reader, an active RFID tag or a passive RFID tag.

In this embodiment, the group of RFID tags can be defined as a group of objects, each being attached by one of the RFID tags and all being stacked as a pile on a platform, such as a shopping cart, a pallet, a container, a rack, a box, a cage, or a chassis with a specific enclosure for storage. As the RFID tags attached to those objects hidden deeply inside the pile might not be able to be inquired and read correctly, the RFID method of FIG. 2 will first enable a reading unit to read each RFID tag and store the accessed information into the memory of the reading unit, as that depicting in step 20, thus, when the pile of objects are inquired by an interrogator, the reading unit can act as the spokesman for all the RFID tags and reply a response back to the interrogator.

Figure 3:
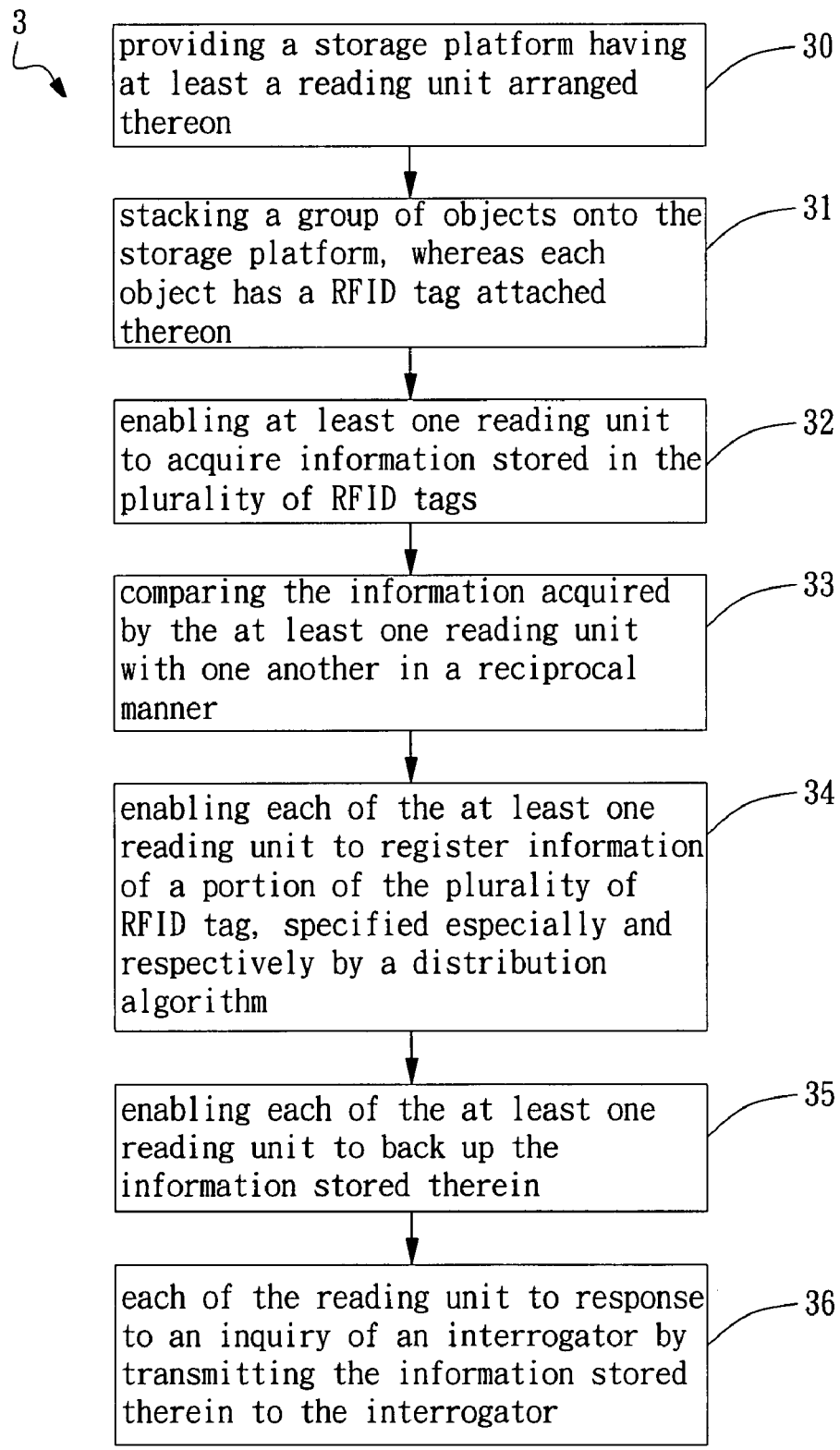
FIG. 3 is a flow chart depicting steps of a method for reading and identifying RFID tag in accordance with a second embodiment of the invention.

Please refer to FIG. 3, is a flow chart depicting steps of a method for reading and identifying RFID tag in accordance with a second embodiment of the invention. The flow of FIG. 3 starts at step 30 and, for clarity, please also refers to FIG. 4A and FIG. 4B for articles addressed in the flow. At step 30, a storage platform 40 is provided, on which at least a reading unit is being arranged, and then the flow proceeds to step 31. In the embodiment shown in FIG. 4A and FIG. 4B, there are two reading units 41 and 42, each can be a RFID reader or an active RFID tag, whereas the storage platform 40 can be an article selected from the group consisting of a shopping cart, a pallet, a container, a rack, a box, a cage, and a chassis with a specific enclosure for storage.

At step 31, a group of objects 43 is being stacked onto the storage platform 40, whereas each object has an unique RFID tag 44 attached thereon, and then the flow proceeds to step 32. It is noted that the RFID tag 44 can be an active RFID tag or a passive RFID tag. At step 32, the two reading units 41, 42 are enabled to acquire information stored in the RFID tags 44 respectively, and then the flow proceeds to step 33. At step 33, the information acquired by the two reading units 41, 42 are compared with one another, and then the flow proceeds to step 34. At step 34, each of the two reading units 41, 42 is enabled to register information of a portion of the RFID tags, specified especially and respectively thereof by a distribution algorithm, and then the flow proceeds to step 35. At step 35, each of the two reading units 41, 42 is enabled to back up the information stored therein, and then the flow proceeds to step 36. In this embodiment, the backing up of the information performed by each of the two reading units 41, 42 is that each of the two reading units 41, 42 is enabled to interrogate with at least one RFID tag which can be selected from one of the RFID tags 44 in the pile, while using the interrogated RFID tags for backing up the information stored therein. Moreover, the actual amount of RFID tags being interrogated by each of the two reading unit 41, 42 is dependent upon actual need.

Figure 4A:
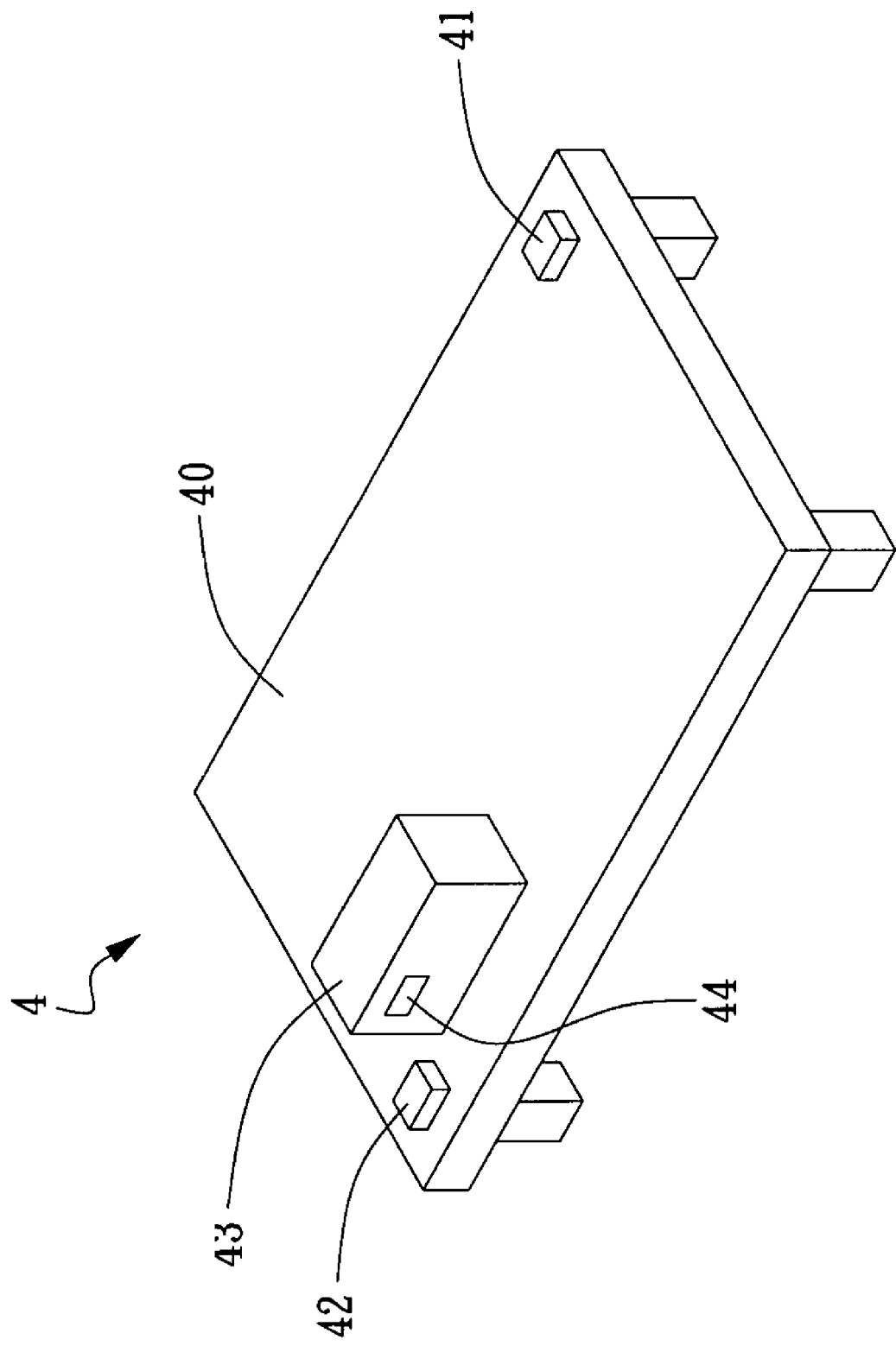
FIG. 4A and FIG. 4B show a system for reading and identifying RFID tag in accordance with a embodiment of the invention.
Figure 4B:
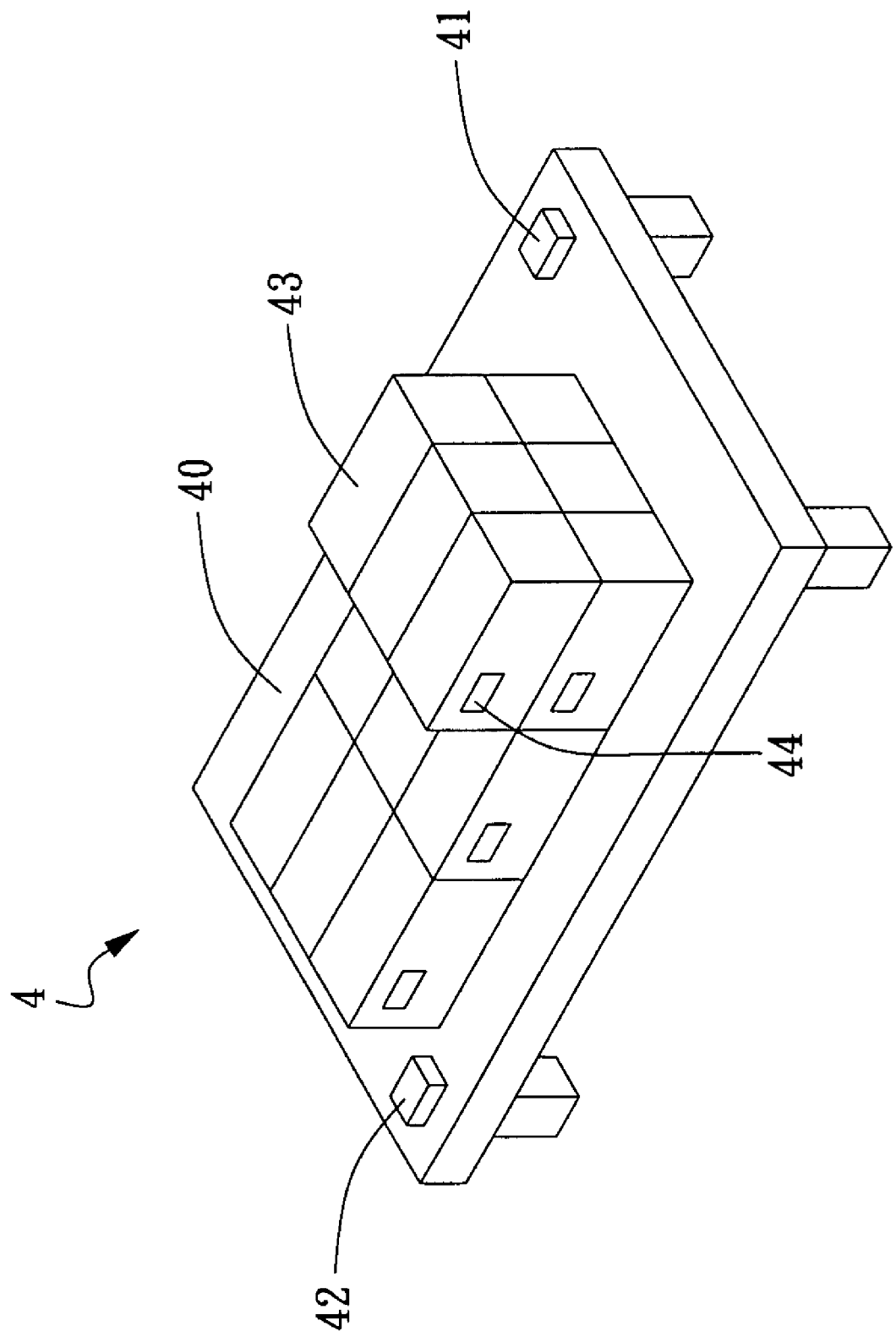
Figure 4C:
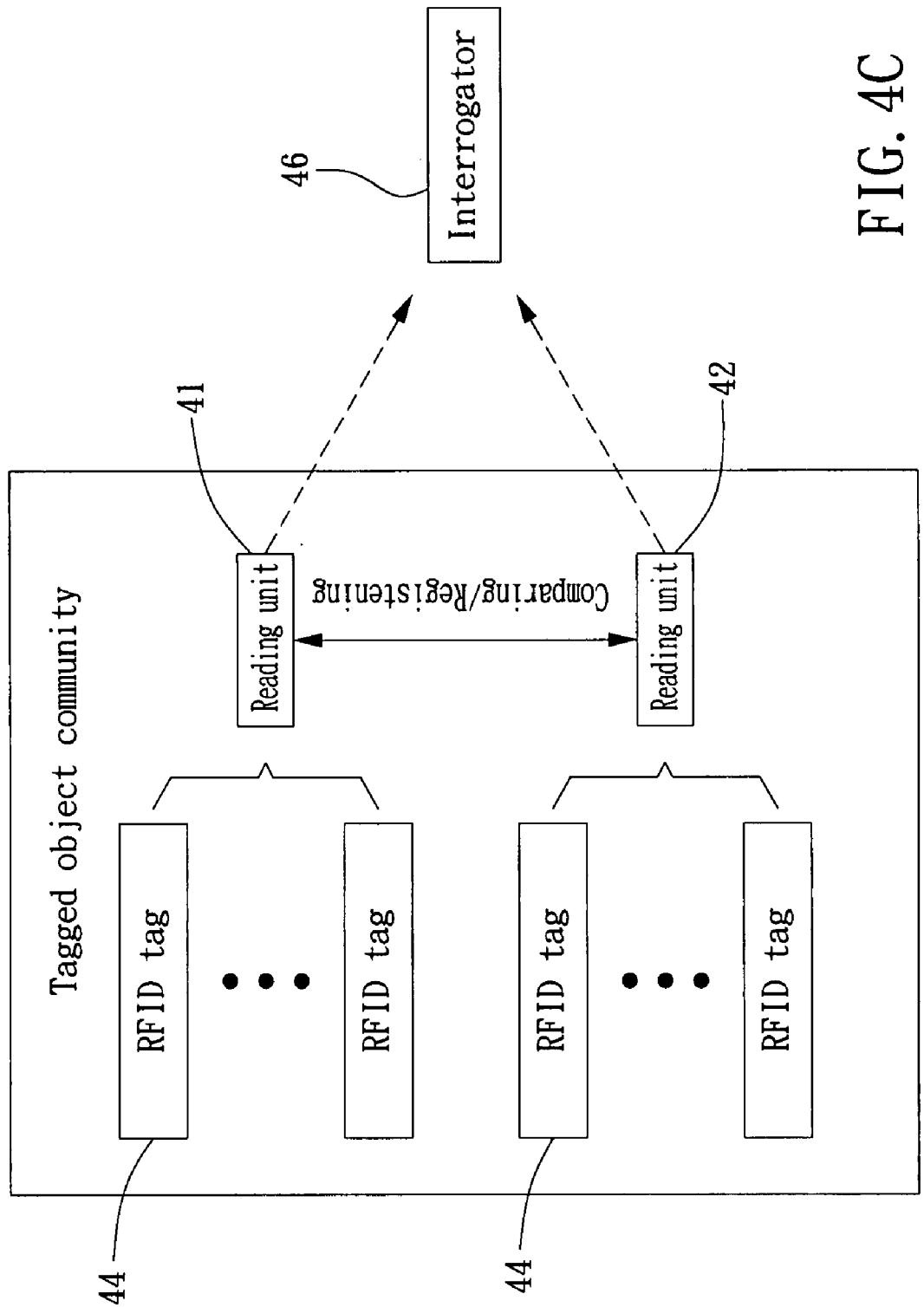
FIG. 4C is a schematic diagram showing a system for reading and identifying RFID of the invention, being interrogated by an interrogator.

As soon as each of the objects 43 are stacked on the storage platform 40, all the information of the RFID tags 44 are finished registering by the two reading units 41, 42 in accordance with the distribution algorithm. Thereafter, platform 40 of the pile of objects is sent to a specific location, e.g. a warehouse having at least an interrogator 46 arranged therein, where the step 36 is carried on with reference to FIG. 4C. At step 36, the two reading units 41, 42, acting as spokesmen of the pile, are enabled to respond to an inquiry of an interrogator by transmitting the identification codes to the interrogator. By the method depicting in FIG. 3, the overall time required for the interrogator to inquire each of the RFID tags in the group can be reduced since it is no longer required for the interrogator to inquire every RFID tag of the group in an one-by-one manner, rather, it needs only to inquire the reading units or backup units. In addition, the reading rate of the RFID system can be improved effectively since at least one specified RFID reader/tag can function as a spokesman for some RFID tags of the group whose communication are blocked as the objects are hidden deeply inside a pile formed by the objects of the group. It is noted that those storage platform 40, reading units 41, 42 and RFID tags 44, shown in FIG. 4A and FIG. 4B, are only basic components used in a RFID system in accordance with a embodiment of the invention.

Figure 5A:
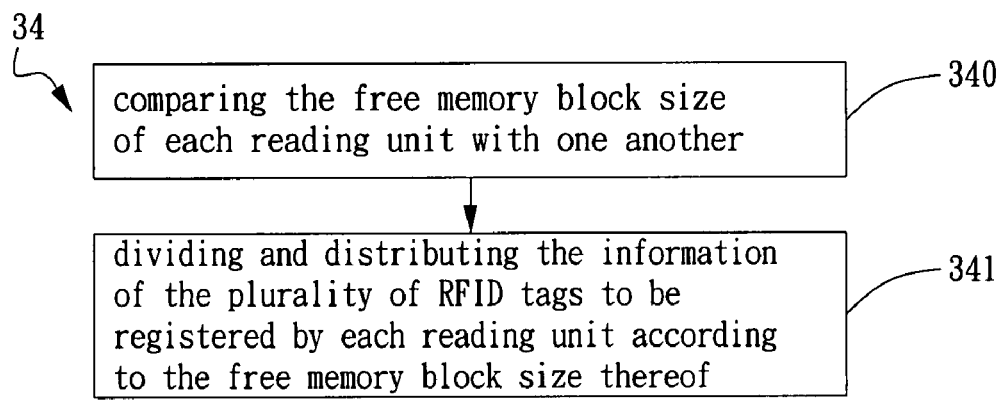
FIG. 5A is a flow chart depicting steps of a distribution algorithm used in a method for reading and identifying RFID tag of the invention, whereas the free memory block size of the RFID tags are not the same.
Figure 5B:
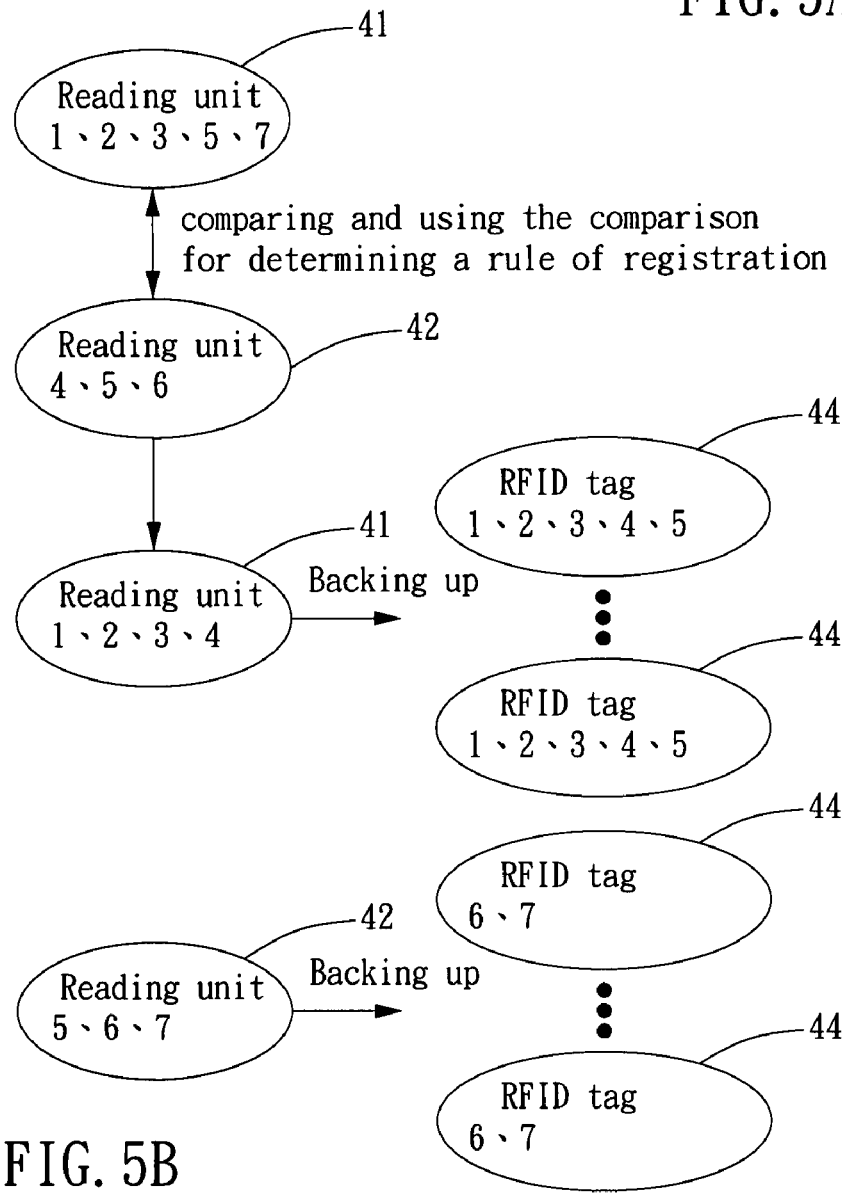
FIG. 5B shows a distribution of the RFID tags in accordance with the distribution algorithm of FIG. 5A.

Please refer to FIG. 5A and FIG. 5B, which respectively is a flow chart depicting steps of a distribution algorithm used in a method for reading and identifying RFID tag of the invention, whereas the free memory block size of the reading units are not the same; and is a schematic diagram showing a distribution of the RFID tags in accordance with the distribution algorithm of FIG. 5A. The flow of FIG. 5A starts at step 340. At step 340, the free memory block size of each of the reading units is compared with that of another reading unit so as to evaluate whether the capacity is equal or not, and then the flow proceeds to step 341. At step 341, as soon as the evaluation indicated that the capacity is not the same, the information of the RFID tags are divided and distributed to be registered by each of the reading units in accordance with the free memory block size thereof. As the embodiment shown in FIG. 5B, there are seven objects, numbered from 1 to 7 and stacked in a pile, each being attached with a RFID tag, whereas initially the objects, numbered by 1, 2, 3, 5, 7, are accessed by a reading unit 41 while other objects, numbered by 4, 5, 6, are accessed by another reading unit 42, the comparison step of FIG. 5A indicated that the free memory block sizes of the two reading units 41, 42 are not equal and thus, in accordance with a distribution algorithm defined basing on their respectively free memory block sizes, the reading unit 41 is directed to access objects numbered by 1, 2, 3, 4 while the reading unit 42 is directed to access objects numbered by 5, 6, 7. Thereafter, the reading unit 41 is directed to backup the information accessed thereby onto RFID tags of objects numbered by 1, 2, 3, 4, 5 while the reading unit 42 is directed to backup the information accessed thereby onto RFID tags of objects numbered by 6, 7.

Figure 6A:
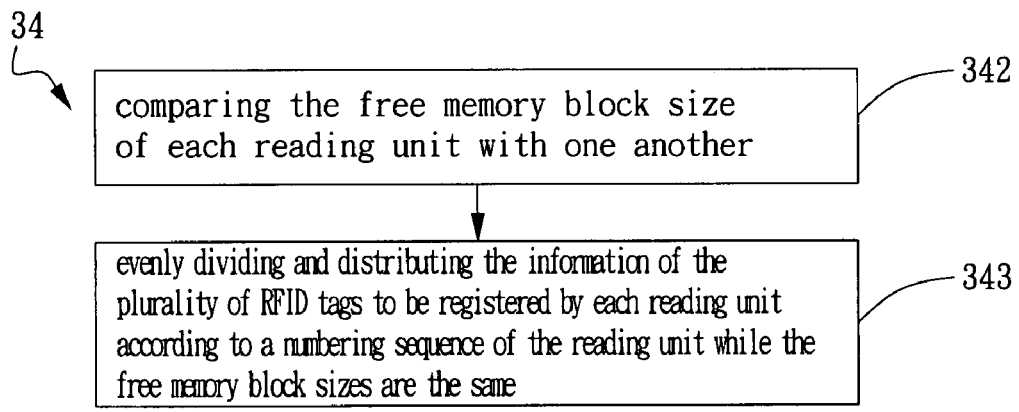
FIG. 6A is a flow chart depicting steps of a distribution algorithm used in a method for reading and identifying RFID tag of the invention, whereas the free memory block size of the RFID tags are equal.
Figure 6B:
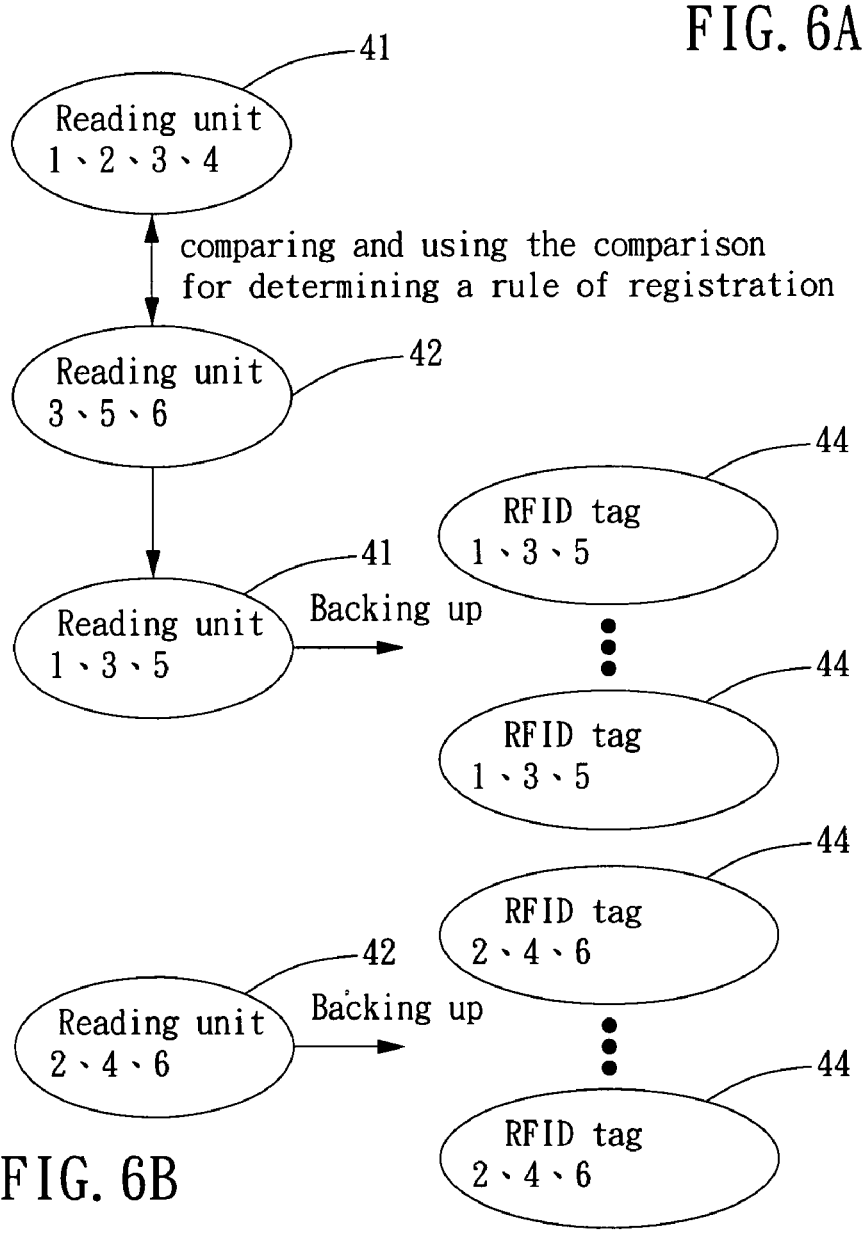
FIG. 6B shows a distribution of the RFID tag in accordance with the distribution algorithm of FIG. 6A.

Please refer to FIG. 6A and FIG. 6B, which respectively is a flow chart depicting steps of a distribution algorithm used in a method for reading and identifying RFID tag of the invention, whereas the free memory block sizes of the reading units are the same; and is a schematic diagram showing a distribution of the RFID tags in accordance with the distribution algorithm of FIG. 6A. The flow of FIG. 6A starts at step 342. At step 342, the free memory block size of each of the reading units is compared with that of another reading unit so as to evaluate whether the capacity is equal or not, and then the flow proceeds to step 343. At step 343, as soon as the evaluation indicated that the capacity are the same, the information of the RFID tags are evenly divided and distributed to be registered by each of the reading units in accordance with a numbering sequence thereof. As the embodiment shown in FIG. 6B, there are six objects, numbered from 1 to 6 and stacked in a pile, each being attached with a RFID tag, whereas initially the objects, numbered by 1, 2, 3, 4, are accessed by a reading unit 41 while other objects, numbered by 3, 5, 6, are accessed by another reading unit 42, the comparison step of FIG. 6A indicated that the free memory block sizes of the two reading units 41, 42 are equal and thus, in accordance with a distribution algorithm defined basing on a numbering sequence, the reading unit 41 is directed to access objects numbered by 1, 3, 5 while the reading unit 42 is directed to access objects numbered by 2, 4, 6. Thereafter, the reading unit 41 is directed to backup the information accessed thereby onto RFID tags of objects numbered by 1, 3, 5 while the reading unit 42 is directed to backup the information accessed thereby onto RFID tags of objects numbered by 2, 4, 6.

Figure 8A:
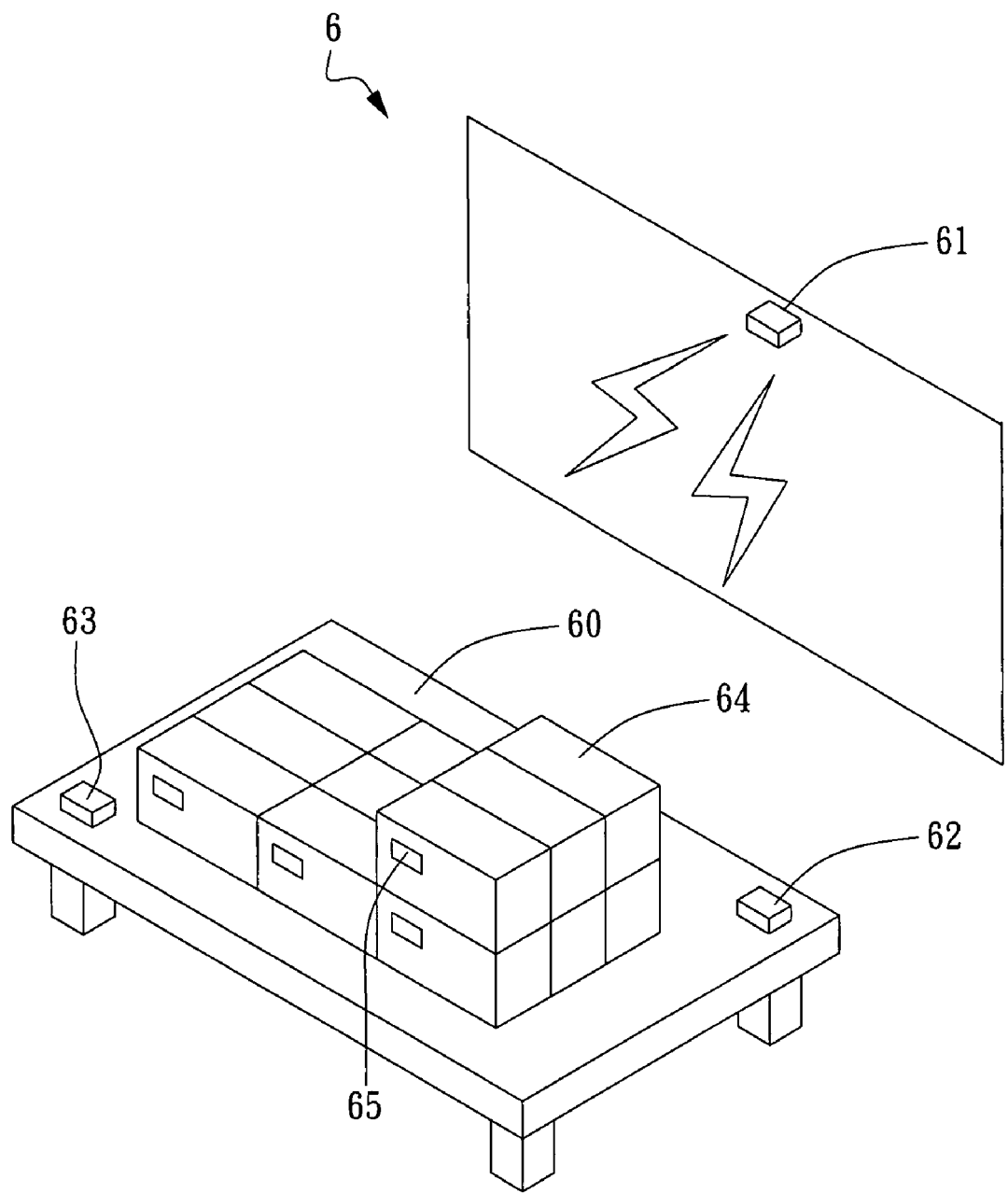
FIG. 8A and FIG. 8B show a system for reading and identifying RFID tag in accordance with another embodiment of the invention.
Figure 8B:
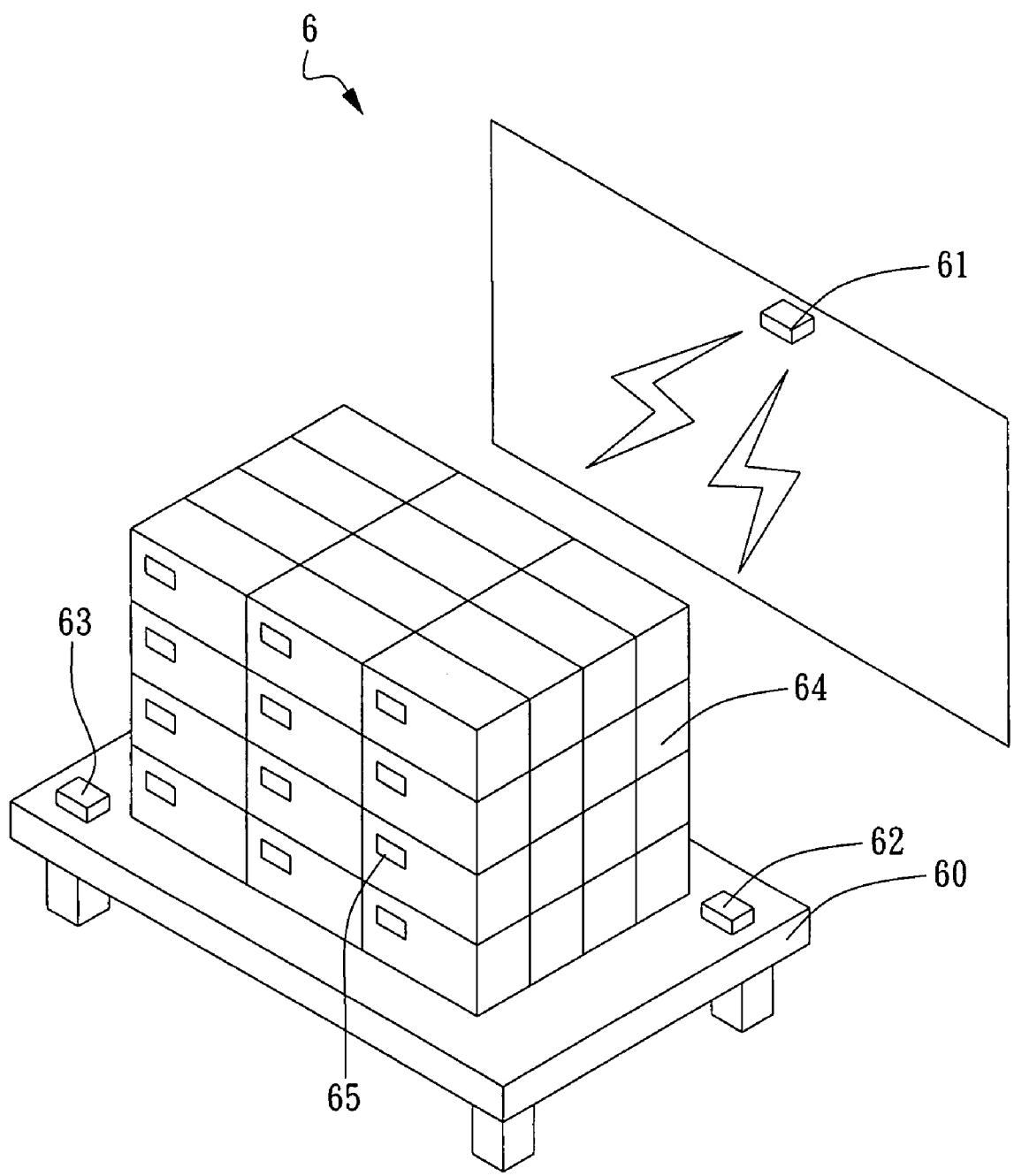

Please refer to FIG. 7, which is a flow chart depicting steps of a method for reading and identifying RFID tag in accordance with a third embodiment of the invention. The flow of FIG. 3 starts at step 30 and, for clarity, please also refers to FIG. 8A and FIG. 8B for articles addressed in the flow. At step 50, a storage platform 60 having at least a reading unit arranged thereon is provided, whereas there is an interrogator 61 being arranged at a position outside the storage platform 60; and then the flow proceeds to step 51. In the embodiment shown in FIG. 8A and FIG. 8B, there are two reading units 62 and 63, each can be a RFID reader or an active RFID tag, whereas the storage platform 60 can be an article selected from the group consisting of a shopping cart, a pallet, a container, a rack, a box, a cage, and a chassis with a specific enclosure for storage. At step 51, a group of objects 64 is being stacked onto the storage platform 60, whereas each object 64 has an unique RFID tag 65 attached thereon, and then the flow proceeds to step 52. It is noted that the RFID tag 65 can be an active RFID tag or a passive RFID tag. At step 52, the interrogator 61 is enabled to acquire information stored in the RFID tags 65 respectively during the stacking of the objects 64, and then the flow proceeds to step 53. As soon as each of the objects 64 is stacked on the storage platform 60, all the information of the RFID tags 65 are finished registering by the interrogator 61. Thereafter, as seen in FIG. 8B, the step 53 is proceeded. At step 53, a distribution algorithm is used to specify and distribute information of a specific portion of the RFID tags 65 to the two reading units 62, 63 respectively, and then the flow proceeds to step 54. It is noted that the distribution algorithm can be the same as that illustrated in FIG. 5A or FIG. 6A, so that it is not described further herein. In addition to the aforesaid steps that the interrogator 61 will divide and distribute the accessed information to the reading units only after each of the objects 64 are stacked on the platform, an alteration of the aforesaid steps can be adopted that as soon as one of the objects 64 is stacked on the platform 60 and accessed by the interrogator 61, the interrogator 61 will immediately distribute the accessed information from object 64 to one reading unit selected from the two reading units 62, 63 in accordance with a distribution algorithm.

After the distribution is accomplished, the step 54 is being proceeded. At step 54, each of the two reading units 62, 63 is enabled to back up the information stored therein. In this embodiment, the backing up of the information performed by each of the two reading units 62, 63 is that each of the two reading units 62, 63 is enabled to interrogate with at least one RFID tag which can be selected from one of the RFID tags 65 in the pile, while using the interrogated RFID tags for backing up the information stored therein. Moreover, the actual amount of RFID tags being interrogated by each of the two reading unit 62, 63 is dependent upon actual need. Thereafter, platform 60 of the pile of objects 64 is sent to a specific location, e.g. a warehouse having at least an interrogator arranged therein, where the step 55 is carried on. At step 55, the two reading units 62, 63, acting as spokesmen of the pile, are enabled to respond to an inquiry of the interrogator of the warehouse by transmitting the information stored therein to the interrogator.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A method for reading and identifying RFID tag, comprising the steps of:
   enabling at least two reading units to acquire information stored in a plurality of RFID tags; comparing the information acquired by the reading units with one another in a reciprocal manner;
   enabling each of the reading units to register information of a portion of the plurality of RFID tags, specified especially and respectively thereof by a distribution algorithm; enabling each of the reading units to respond to an inquiry of an interrogator by transmitting the information stored therein to the interrogator and enabling each of the reading units to back up the information stored therein onto at least a backup unit.

2. The method of claim 1, wherein the backup unit is a device selected from the group consisting of a RFID reader, an active RFID tag and a passive RFID tag.

3. The method of claim 1, wherein the reading unit is a device selected from the group consisting of a RFID reader and an active RFID tag.

4. The method of claim 1, wherein the distribution algorithm further comprises the steps of:
   comparing the free memory block size of each of the reading units with one another; and
   dividing and distributing the information of the plurality of RFID tags to be registered by each reading unit in accordance with the free memory block size thereof while the free memory block sizes are not the same.

5. The method of claim 1, wherein the distribution algorithm further comprises the steps of:
   comparing the free memory block size of each of the reading units with one another; and
   evenly dividing and distributing the information of the plurality of RFID tags to be registered by each reading unit in accordance with a numbering sequence of the reading units where the capacity of the free memory blocks thereof are the same.

6. A system for reading and identifying RFID tag, comprising:
   a plurality of RFID tags, being respectively attached to a group of objects placed on a storage platform; and
   at least two reading units being disposed on the storage platform and capable of accessing information of the plurality of RFID tags and comparing the acquired information stored in each with one another in a reciprocal manner while using the comparison as basis to select a portion of the RFID tags to be registered, wherein the at least two reading units are configured to back up the information stored therein onto at least a backup unit.

7. The system of claim 6, wherein the reading unit is a device selected from the group consisting of a RFID reader and an active RFID tag.

8. The system of claim 6, wherein the storage platform is an article selected from the group consisting of a shopping cart, a pallet, a container, a rack, a box, a cage, and a chassis with a specific enclosure for storage.

9. The system of claim 6, further comprising:
   an interrogator, connected to an external computer system, capable of accessing information stored in the reading units.

10. The system of claim 9, wherein the interrogator is a device selected from the group consisting of a RFID reader and an active RFID tag.

11. The system of claim 9, wherein the storage platform is an article selected from the group consisting of a shopping cart, a pallet, a container, a rack, a box, a cage, and a chassis with a specific enclosure for storage.

12. The system of claim 6, further comprising an interrogator being connected to an external computer system is capable of accessing the information stored in each of the plurality of RFID tags when the group of objects is stacked on the storage platform, and is capable of dividing and distributing the information to at least a reading unit.

13. The system of claim 12, wherein the interrogator is a device selected from the group consisting of a RFID reader and an active RFID tag.

14. The system of claim 12, wherein the storage platform is an article selected from the group consisting of a shopping cart, a pallet, a container, a rack, a box, a cage, and a chassis with a specific enclosure for storage.

* * * * *